Figure 1:
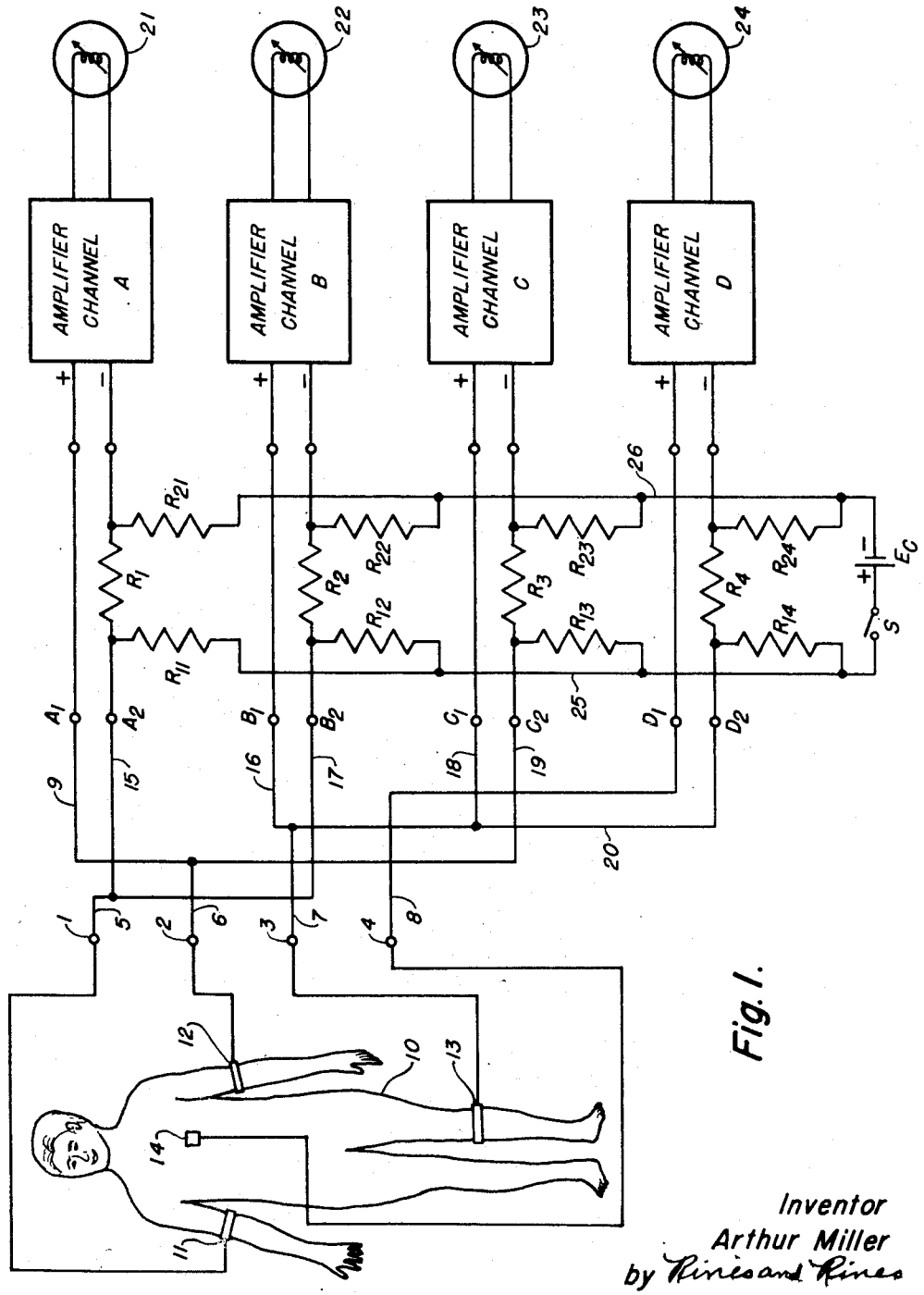

Inventor
Arthur Miller
by Rines and Rines
Attorneys

Patented Nov. 24, 1953

2,660,165

UNITED STATES PATENT OFFICE 2,660,165

ELECTRICAL CALIBRATION SYSTEM

Arthur Miller, Watertown, Mass., assignor to Sanborn Company, Cambridge, Mass., a corporation of Massachusetts Application June 16, 1950, Serial No. 168,491

11 Claims. (Cl. 128—2.06)

1

The present invention relates to calibration systems, and more particularly to systems for simultaneously producing momentary electrical calibration impulses in a plurality of amplifying channels into which independent electrical impulses are respectively fed from a corresponding plurality of signal sources. From a more specific aspect, the invention relates to electrocardiography.

In many oscillographic and other electrical-voltage recording or indicating systems, it has been customary to include, in series with the source of electrical voltages to be recorded or indicated, a source of calibration voltage of known magnitude. The recorded or indicated electrical voltages may thereby be measured in terms of the known calibrating voltage. As an illustration, in electrophysiological measurements, such as the recording of an electrocardiogram, a calibration voltage impulse of exactly one millivolt amplitude is usually momentarily impressed upon the electrocardiograph amplifying and recording circuit by means of a push-button switch. At the will of the operator, the momentary closing of the push-button switch will produce upon the electrocardiogram an impulse of one millivolt amplitude, with reference to which the amplitude of the electrical voltage impulse between a pair of electrodes resulting from the cardiac activity of a patient may be determined.

When, however, it is desired to record or indicate simultaneously the voltage impulses between the electrodes of each of several pairs of electrodes, positioned at different points of the patient's body, a plurality of separate amplifying and recording or indicating channels are required. In order that the calibration of the resulting voltages in these different channels shall be comparable, it is necessary to provide for the simultaneous application of the calibration voltage impulses in all of the amplifying and recording or indicating channels. The simultaneous application of the calibration voltage impulses renders it possible also to check the timing alignment of the various amplifying and recording or indicating channels, sometimes referred to as the "parallax" of the amplifying and recording or indicating systems.

It is most desirable, for ease of operation, that the calibration voltage impulses be applied to all the channels through the operation of a single push-button. This may be effected by mechanically coupling the push-button to a plurality of separate switches for respectively applying cali-

2 bration voltage impulses from a plurality of separate calibration sources to the respective separate channels. It is extremely difficult, if not impossible, in practice, however, to guarantee the exact simultaneity of the actual closing of the separate switches through the manipulation of the single push-button. It is desirable, therefore, that the calibration voltage impulses shall all be derived from a single calibration voltage source, and that this be effected in response to the momentary operation of a single switch. It is also necessary, however, so to design the calibration system as to prevent both short-circuits between the input circuits of the various channels and interaction between the voltage signals in the various channels.

An object of the present invention, accordingly, is to provide a multi-channel amplifying system having a new and improved calibration system for simultaneously impressing electrical calibration impulses in the amplifying channels.

Another object is to provide for simultaneously impressing the calibration impulses upon the separate amplifying channels from a single calibration source of energy, without producing interaction between the channels.

A further object is to provide a multi-channel amplifying system of this character the calibration system of which shall be under the control of a single switch.

Still a further object is to provide a new and improved calibration system of the above-described character that shall be particularly adapted for simultaneously producing electrical calibration impulses in multi-channel electrocardiograph systems.

Other and further objects will be explained hereinafter and will be particularly pointed out in the appended claims.

Figure 2:
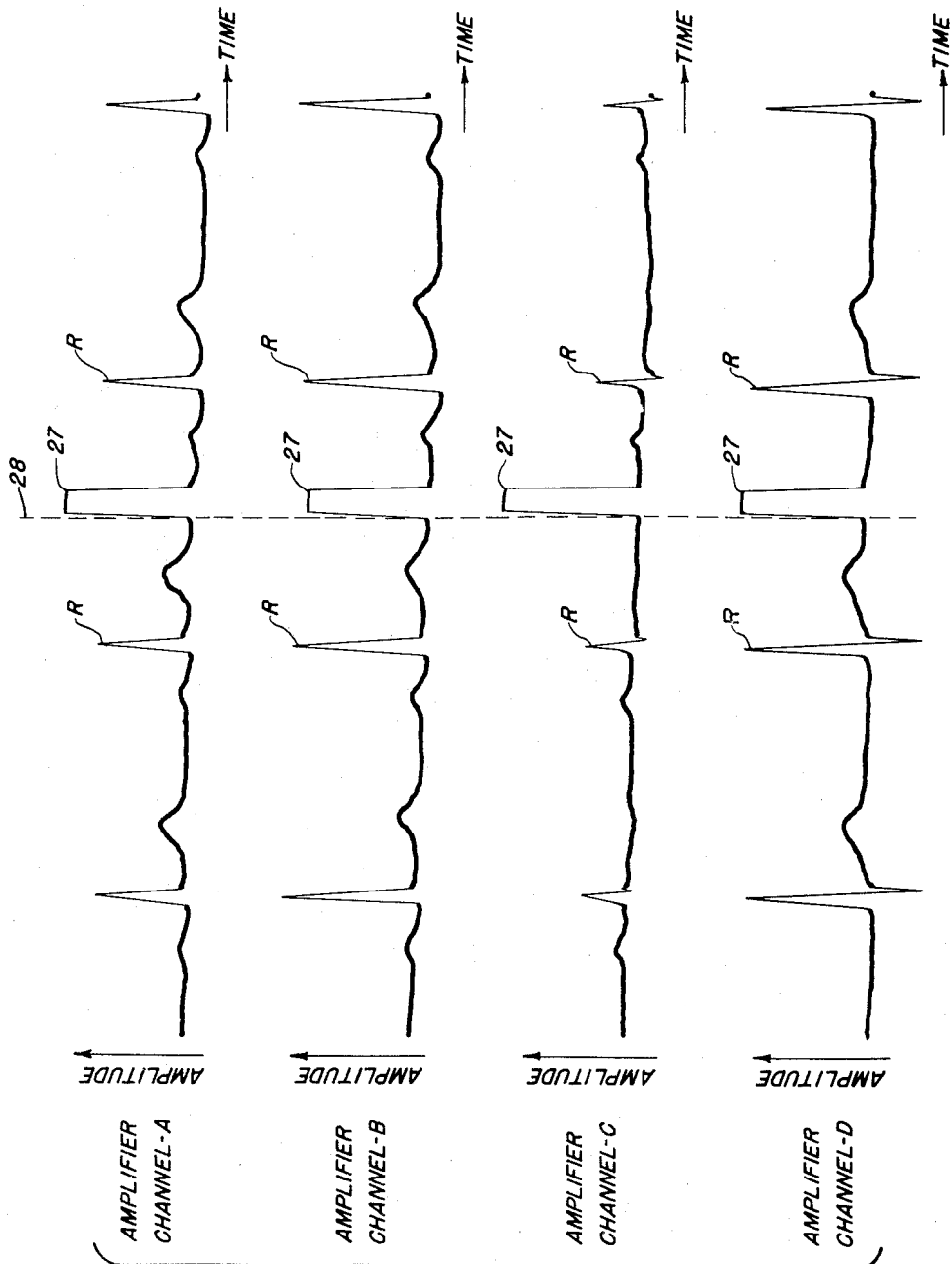

The invention will now be described more fully in connection with the accompanying drawings, Fig. 1 of which is a schematic circuit diagram illustrating a multi-channel electrocardiograph system provided with a calibration system embodying the present invention, in preferred form; and Fig. 2 is a reproduction of electrocardiograms that may be recorded in the various channels illustrated in the electrocardiograph system of Fig. 1.

The multi-channel electrocardiograph system is shown, for illustrative purposes, as provided with four conventional electrocardiograph amplifier channels A, B, C and D, the output circuits of which are connected to respective recording or indicating devices, such as recording galvanometers, 21, 22, 23 and 24.

It may be desired, as an illustration, to record simultaneously, in the four channels of the system of Fig. 1, the electrical impulses associated with the cardiac activity of a patient 10 manifested between four corresponding different pairs of points on the patient's body: first, between the left arm and right arm; secondly, between the left leg and the right arm; thirdly, between the left leg and the left arm; and, fourthly, between the breast or chest and the left leg.

The left arm of the patient is shown connected, by an electrode 12, to a terminal 2; and thence, by conductors 6 and 9, to a terminal $A_1$. The terminal $A_1$, in turn, is connected to the positive terminal of the input circuit of the amplifier channel A. The right arm of the patient is similarly shown connected, by an electrode 11, to a terminal 1; and thence, by conductors 5 and 15, to a terminal $A_2$. The terminal $A_2$ is shown connected, through a resistor $R_1$, to the negative terminal of the input circuit of the amplifier channel A. The electrical impulses originating between the left and right arms of the patient 10, as a result of his cardiac activity, are thus applied to the input circuit of the amplifier channel A, with the resistor $R_1$ in series with the source of voltage signals, namely, the portion of the patient's body between his left and right arms. As recorded by the recording system 21, as a function of time, the amplitude of these electrical impulses may be represented by the electrocaardiogram labelled: "Amplifier Channel-A," Fig. 2.

An electrode 13, strapped to the left leg of the patient, is similarly shown connected to a terminal 3; and thence, by conductors 7 and 16, to a terminal $B_1$ that, in turn, connects with the positive terminal of the input circuit of the amplifier channel B. The right arm of the patient is shown connected, by the electrode 11 and the terminal 1, by conductors 5 and 17, to a terminal $B_2$. The terminal $B_2$, in turn, is connected, through a series-connected resistor $R_2$, to the negative terminal of the input circuit of the amplifier channel B. The electrical signals manifested between the patient's left leg and right arm are therefore applied to the input circuit of the amplifier channel B. The recording system 22 may show these electrical signals as represented by the electrocardiogram labelled: "Amplifier Channel-B."

The left leg of the patient is also shown connected, by means of the electrode 13, the terminal 3 and the conductor 7, to a conductor 18, that connects with a terminal $C_1$, which is connected to the positive terminal of the input circuit of the amplifier channel C. The left arm of the patient 10 is also connected, by the electrode 12, terminal 2 and conductor 6, to a conductor 19 and a terminal $C_2$. The terminal $C_2$ is connected, through a series-connected resistor $R_3$, to the negative terminal of the input circuit of the amplifier channel C. The electrical signals originating between the patient's left leg and left arm are therefore applied to the input circuit of the amplifier channel C. These may be represented by the recording system 23 as shown by the electrocardiogram labelled: "Amplifier Channel-C."

The chest of the patient is shown connected, by an electrode 14, to a terminal 4; and thence, by a conductor 8, to a terminal $D_1$ that, in turn, is connected to the positive side of the input circuit of the amplifier channel D. The left leg of the patient is connected by the electrode 13, terminal 3 and conductor 7, by a conductor 20, to a terminal $D_2$. The terminal $D_2$ is connected, through a series-connected resistor $R_4$, to the negative terminal of the input circuit of the amplifier channel D. The electrical impulses manifested in the body of the patient 10 between the chest and the left leg are thus applied in the input circuit of the amplifier channel D. These impulses may be recorded by the recording system 24, as represented by the electrocardiogram labelled: "Amplifier Channel-D."

The four electrocardiograms, representing the electrical impulses produced between different portions of the human body, are of different shape and amplitude. In order to correlate the information contained in these various electrocardiograms, it is desirable, among other things, to compare their amplitudes with a known calibration voltage applied simultaneously to all the recording channels. As an illustration, it may be desirable to apply exactly equal calibrating pulses 27 to all the channels A, B, C and D at the same instant of time 28, between successive R-waves of the four electrocardiograms.

In accordance with a feature of the present invention, this end may be achieved with the aid of respective pairs of further resistors connected to the terminals of the respective series-connected resistors $R_1$, $R_2$, $R_3$ and $R_4$. The upper terminals of a pair of resistors $R_{11}$ and $R_{21}$ are accordingly shown connected, respectively, to the left and right terminals of the series-connected resistor $R_1$; the upper terminals of a pair of resistors $R_{12}$ and $R_{22}$ are similarly shown connected to the left and right terminals of the series-connected resistor $R_2$; the upper terminals of a pair of resistors $R_{13}$ and $R_{23}$ are similarly connected to the terminals of resistor $R_3$; and the upper terminals of a further pair of resistors $R_{14}$ and $R_{24}$ are similarly connected to the terminals of the resistor $R_4$. The lower terminals of the resistors $R_{11}$, $R_{12}$, $R_{13}$ and $R_{14}$ are connected, by a common conductor 25, to one terminal, shown as a fixed contact member, of a switch S that may, for example, be of the push-button type. The lower terminal of each of the resistors $R_{21}$, $R_{22}$, $R_{23}$ and $R_{24}$ is similarly connected, by a common conductor 26, to the negative terminal of a standard calibrating source of energy, shown as a direct-current battery $E_c$, the positive terminal of which is connected to the movable-arm contact member of the switch S. When the switch S is momentarily depressed, therefore, an impulse of electric energy will be fed from the calibration source of energy $E_c$, through the resistors of the respective pairs of resistors $R_{11}R_{21}$, $R_{12}R_{22}$, $R_{13}R_{23}$ and $R_{14}R_{24}$, across the respective corresponding series-connected resistors $R_1$, $R_2$, $R_3$ and $R_4$.

With proper values and proper balancing of the resistor networks above-described, any desired value of calibration impulse may be applied to each of the channels A, B, C and D, as later explained, without short-circuiting the various input connections from the various portions of the body 10 and without any interaction between the channels.

If $n$ represents the integer corresponding to any particular amplifying channel, which may here be 1, 2, 3 or 4, then the relationship between the amplitude $E_p$ of the resulting calibration impulse that is produced from the voltage source Ec across the series-connected resistor $R_n$ and the value of the series-connected resistor $R_n$ may be derived by applying Ohm's law to the calibration circuit associated with each channel comprising the series-connected resistor $R_n$, the pair of resistors $R_{1n}$ and $R_{2n}$, and the calibration voltage source of voltage value Ec, yielding the expression $$E_p = \frac{R_n}{R_{1n} + R_{2n} + R_n} E_c$$

The calibration voltage impulse $E_p$ produced from the source Ec across the resistor $R_n$ in each amplifier channel input circuit is thus a fractional part of the voltage of the calibration voltage source Ec, the fraction being the ratio of the value of the resistance of the series-connected resistor $R_n$ to the value of the sum of the resistances of the series-connected resistor $R_n$ and the pair of resistors $R_{1n}$ and $R_{2n}$. Due to the high input impedance of the amplifier grid circuit in comparison with the patient circuit impedance, substantially all of $E_p$ reaches the amplifier grids.

For the case, previously described, of equal calibration impulses 27 in each channel, the resistors $R_1$, $R_2$, $R_3$ and $R_4$ may have the same value, which should be low compared with the impedance of the portions of the input circuits of the amplifier channels A, B, C and D to the right of the input terminals of the channels shown in the drawings at — and +. The values of the resistances of the resistors of the respective pairs of resistors $R_{1n}$ and $R_{2n}$, moreover, may all be equal, and, in order to prevent the interaction before described, of value high compared with the impedances of the signal sources—in this case, the impedances between the various portions of the body 10 to which the electrodes are applied.

As an illustration, between the terminals 1 and 2, illustrated in Fig. 1, there are shown bridged a parallel combination of two series-connected pairs of resistors: one pair, comprising the resistors $R_{11}$ and $R_{13}$; and the other pair, the resistors $R_{21}$ and $R_{23}$. The resistance values of these resistors should be chosen sufficiently high so that this particular combination shall have a total impedance large compared with the impedance between the right arm and the left arm of the patient 10.

It has been found, for electrocardiograph applications, that, with a calibration source of energy Ec of one volt, each of the resistors $R_{1n}$ and $R_{2n}$ should have a value of the order of several hundred thousand ohms, say 500,000 ohms, more or less. The resistors $R_n$ are preferably of the order of thousands of ohms, say 1000 ohms, more or less. The equal calibration impulses 27, as may be calculated from the preceding equation, may then have a voltage value of the order of a millivolt. Under these conditions, if the negative terminal of the calibration voltage source be considered a reference, closing the switch S will produce a potential difference between this reference point and each of the terminals $A_2$, $B_2$, $C_2$ and $D_2$ of substantially half the voltage of the calibration voltage source Ec. There would then be a condition of balance effected in the networks since no potential difference would exist between the terminals $A_2$, $B_2$, $C_2$ and $D_2$ and, therefore, no circulating current from the terminal $A_2$, for example, through the source impedance of the patient's body, back to the terminals $B_2$, $C_2$ or $D_2$. Such a circulating current would produce a deleterious voltage that would interact with, either adding to or subtracting from, the calibration voltage pulse applied to each of the recording channels. The differentiation between the calibration pulse and the cardiac waves, moreover, is based upon the suddenness of the deflection produced by the closing or opening of the switch S. This allows a measurement of the amplitude of this deflection to be made regardless of where in the cardiac cycle the calibration pulse is applied, although it is easier to do so when the pulse appears during the period of cardiac diastole, when the base line is relatively undisturbed, as shown in the Fig. 2.

As hereinafter indicated, it is not necessary, however, that the resistances of all of the resistors of the pairs of resistors $R_{1n}$ and $R_{2n}$ be equal, or that the resistances of the resistors of each pair of resistors be equal. It is not essential, moreover, particularly where different values of calibration impulses are desired in the different channels, that the resistance values of the series-connected resistors $R_n$ in each channel be equal. In general, the before-mentioned condition of balance for the calibration resistor network system may be effected if the ratio $$\frac{R_{1n}}{R_{1n} + R_{2n} + R_n}$$

is maintained constant. It may be shown that if this condition obtains, $$\frac{R_{2n}}{R_{1n} + R_{2n} + R_n}$$

is then likewise constant. For electrocardiograph systems, if the resistances of the resistors of each pair of resistors $R_{1n}$ and $R_{2n}$ are not equal, the combined resistance of each pair of resistors should preferably be of high impedance exceeding the order of about 200,000 ohms, in order to maintain independence and prevent interaction between the respective channels as before explained.

Though the invention has been described above, for purposes of illustration, as applied to a multichannel electrocardiograph system, it will be understood that it is of much broader scope, adapted for use with any multi-channel amplifying and recording or indicating system in which it is desired simultaneously to produce calibration voltages. Further modifications will therefore occur to persons skilled in the art, and all such are considered to fall within the spirit and scope of the present invention, as defined in the appended claims.

What is claimed is:

1. In an amplifier system for amplifying the electrical impulses respectively fed to the input circuits of a plurality of amplifying channels from signal sources connected to the respective input circuits, a calibration system comprising a plurality of resistors, one series-connected in the input circuit of each amplifying channel and each of resistance low compared with the impedance of the input circuit in which it is connected, a calibration source of energy, a pair of resistors corresponding to each series-connected resistor respectively connected to the terminals thereof and of respective resistances high compared with the impedance of the signal source connected in the input circuit in which the corresponding series-connected resistor is connected, and means momentarily operative to impress electrical calibration impulses from the calibration source of energy simultaneously through the resistors of the respective pairs of resistors and across the series-connected resistors to which they respectively correspond in order simultaneously to impress momentary electrical calibration impulses in the amplifying channels.

2. In an amplifier system for amplifying the electrical impulses respectively fed to the input circuits of $n$ amplifying channels from $n$ signal sources connected to the respective input circuits, a calibration system comprising $n$ resistors, one series-connected in the input circuit of each amplifying channel and each of resistance $R_n$ low compared with the impedance of the input circuit in which it is connected, a calibration source of energy, a pair of resistors corresponding to each series-connected resistor respectively connected to the terminals thereof and of respective resistances $R_{1n}$ and $R_{2n}$ high compared with the impedance of the signal source connected in the input circuit in which the corresponding series-connected resistor is connected and related to the resistance $R_n$ of the corresponding series-connected resistor substantially by the relation that $$\frac{R_{1n}}{R_{1n}+R_{2n}+R_n}$$

is constant, and means momentarily operative to impress electrical calibration impulses from the calibration source of energy simultaneously through the resistors of the respective pairs of resistors across the series-connected resistors to which they respectively correspond in order simultaneously to impress momentary electrical calibration impulses in the amplifying channels.

3. An amplifier-and-recorder system having, in combination, $n$ amplifying channels each having an input circuit and an output circuit, means for respectively connecting the input circuits to $n$ signal sources, whereby signals from the signal sources will be fed to the respective input circuits for amplification by the respective amplifying channels, means for connecting the output circuits to recorders, $n$ resistors, one series-connected in the input circuit of each amplifying channel and each of resistance $R_n$ low compared with the impedance of the input circuit in which it is connected, a calibration source of energy, a pair of resistors corresponding to each series-connected resistor respectively connected to the terminals thereof and of respective resistances $R_{1n}$ and $R_{2n}$ high compared with the impedance of the signal source connected to the input circuit in which the corresponding series-connected resistor is connected and related to the resistance $R_n$ of the corresponding series-connected resistor substantially by the relation that $$\frac{R_{1n}}{R_{1n}+R_{2n}+R_n}$$

is constant, and means momentarily operative to impress electrical calibration impulses from the calibration source of energy simultaneously through the resistors of the respective pairs of resistors across the series-connected resistors to which they respectively correspond in order simultaneously to impress momentary electrical calibration impulses in the amplifying channels.

4. In an electrocardiograph system for amplifying the electrical impulses respectively fed to the input circuits of $n$ amplifying channels from $n$ pairs of terminals interconnecting different parts of the body of a patient with the respective input circuits, a calibration system comprising $n$ resistors, one series-connected in the input circuit of each amplifying channel and each of resistance $R_n$ low compared with the impedance of the input circuit in which it is connected, a calibration source of energy, a pair of resistors corresponding to each series-connected resistor respectively connected to the terminals thereof and of respective resistances $R_{1n}$ and $R_{2n}$ high compared with the impedance of the patient's body between the pair of terminals connected to the input circuit in which the corresponding series-connected resistor is connected and related to the resistance $R_n$ of the corresponding series-connected resistor substantially by the relation that $$\frac{R_{1n}}{R_{1n}+R_{2n}+R_n}$$

is constant, and means momentarily operative to impress electrical calibration impulses from the calibration source of energy simultaneously through the resistors of the respective pairs of resistors across the series-connected resistors to which they respectively correspond in order simultaneously to impress momentary electrical calibration impulses in the amplifying channels.

5. In an amplifier system for amplifying the electrical impulses respectively fed to the input circuits of a plurality of amplifying channels from signal sources connected to the respective input circuits, a calibration system comprising a plurality of resistors, one series-connected in the input circuit of each amplifying channel and each of resistance low compared with the impedance of the input circuit in which it is connected, a calibration source of energy, a pair of resistors corresponding to each series-connected resistor respectively connected to the terminals thereof and of substantially equal resistance high compared with the impedance of the signal source connected in the input circuit in which the corresponding series-connected resistor is connected, and means momentarily operative to impress electrical calibration impulses from the calibration source of energy simultaneously through the resistors of the respective pairs of resistors and across the series-connected resistors to which they respectively correspond in order simultaneously to impress momentary electrical calibration impulses in the amplifying channels.

6. In an amplifier system for amplifying the electrical impulses respectively fed to the input circuits of a plurality of amplifying channels from signal sources connected to the respective input circuits, a calibration system comprising a plurality of resistors, one series-connected in the input circuit of each amplifying channel and each of resistance low compared with the impedance of the input circuit in which it is connected, a calibration source of energy, a plurality of similar pairs of resistors, one pair of resistors corresponding to each series-connected resistor respectively connected to the terminals thereof and of substantially equal resistance high compared with the impedance of the signal source connected in the input circuit in which the corresponding series-connected resistor is connected, and means momentarily operative to impress electrical calibration impulses from the calibration source of energy simultaneously through the resistors of the respective pairs of resistors and across the series-connected resistors to which they respectively correspond in order simultaneously to impress momentary electrical calibration impulses in the amplifying channels.

7. In an amplifier system for amplifying the electrical impulses respectively fed to the input circuits of a plurality of amplifying channels from signal sources connected to the respective input circuits, a calibration system comprising a plurality of substantially equal resistors, one series-connected in the input circuit of each amplifying channel and each of resistance low compared with the impedance of the input circuit in which it is connected, a calibration source of energy, a plurality of similar pairs of resistors, one pair of resistors corresponding to each series-connected resistor respectively connected to the terminals thereof and of substantially equal resistance high compared with the impedance of the signal source connected in the input circuit in which the corresponding series-connected resistor is connected, and means momentarily operative to impress similar electrical calibration impulses from the calibration source of energy simultaneously through the resistors of the respective pairs of resistors and across the series-connected resistors to which they respectively correspond in order simultaneously to impress momentary electrical calibration impulses in the amplifying channels.

8. In an electrocardiograph system for amplifying the electrical impulses respectively fed to the input circuits of a plurality of amplifying channels from pairs of terminals interconnecting different points of the body of a patient with the respective input circuits, a calibration system comprising a plurality of resistors, one series-connected in the input circuit of each amplifying channel and each of resistance low compared with the impedance of the input circuit in which it is connected, a calibration source of energy, a pair of resistors corresponding to each series-connected resistor respectively connected to the terminals thereof and of respective resistance high compared with the impedance of the patient's body between the pair of terminals connected to the input circuit in which the corresponding series-connected resistor is connected, and means momentarily operative to impress electrical calibration impulses from the calibration source of energy simultaneously through the resistors of the respective pairs of resistors across the respective series-connected resistors to which they respectively correspond in order simultaneously to impress momentary electrical calibration impulses in the amplifying channels.

9. In an electrocardiograph system for amplifying the electrical impulses respectively fed to the input circuits of a plurality of amplifying channels from pairs of terminals interconnecting different points of the body of a patient with the respective input circuits, a calibration system comprising a plurality of substantially equal resistors, one series-connected in the input circuit of each amplifying channel and each of resistance low compared with the impedance of the input circuit in which it is connected, a calibration source of energy, a plurality of similar pairs of resistors, one pair of resistors corresponding to each series-connected resistor respectively connected to the terminals thereof and of substantially equal resistance high compared with the impedance of the patient's body between the pair of terminals connected to the input circuit in which the corresponding series-connected resistor is connected, and means momentarily operative to impress similar electrical calibration impulses from the calibration source of energy simultaneously through the resistors of the respective pairs of resistors across the respective series-connected resistors to which they respectively correspond in order simultaneously to impress momentary electrical calibration impulses in the amplifying channels.

10. An electrocardiograph system having, in combination, a plurality of amplifying channels, each having an input circuit and an output circuit, means for respectively connecting the input circuits to pairs of terminals connected to different parts of the body of a patient, means for connecting the output circuits to recorders, a plurality of resistors of resistance of the order of thousands of ohms, one series-connected in the input circuit of each amplifying channel, a direct-current calibration source of energy of value of the order of a volt, a plurality of pairs of resistors of value of the order of hundreds of thousands of ohms corresponding to each series-connected resistor respectively connected to the terminals thereof, and means momentarily operative to impress millivolt electrical calibration impulses from the calibration source of energy simultaneously through the resistors of the respective pairs of resistors across the series-connected resistors to which they respectively correspond in order simultaneously to impress millivolt electrical calibration impulses in the amplifying channels.

11. An electrocardiograph system having, in combination, a plurality of amplifying channels, each having an input circuit and an output circuit, means for respectively connecting the input circuits to pairs of terminals connected to different parts of the body of a patient, means for connecting the output circuits to recorders comprising a plurality of substantially equal resistors of resistance of the order of thousands of ohms, one series-connected in the input circuit of each amplifying channel, a direct-current calibration source of energy of value of the order of a volt, a plurality of pairs of substantially equal resistors of value of the order of hundreds of thousands of ohms corresponding to each series-connected resistor respectively connected to the terminals thereof, and a switch momentarily operative to impress similar millivolt electrical calibration impulses from the calibration source of energy simultaneously through the resistors of the respective pairs of resistors across the series-connected resistors to which they respectively correspond in order simultaneously to impress similar millivolt electrical calibration impulses in the amplifying channels.

ARTHUR MILLER.

References Cited in the file of this patent
UNITED STATES PATENTS

| Number | Name | Date |
|---|---|---|
| 1,647,710 | Nichols | Nov. 1, 1927 |
| 2,400,583 | White | May 21, 1946 |